J. K. STEWART.
STEERING WHEEL DRIVE FOR AUTOMOBILE CARRIED INSTRUMENT.
APPLICATION FILED JUNE 1, 1914.
1,205,054.
Patented Nov. 14, 1916.
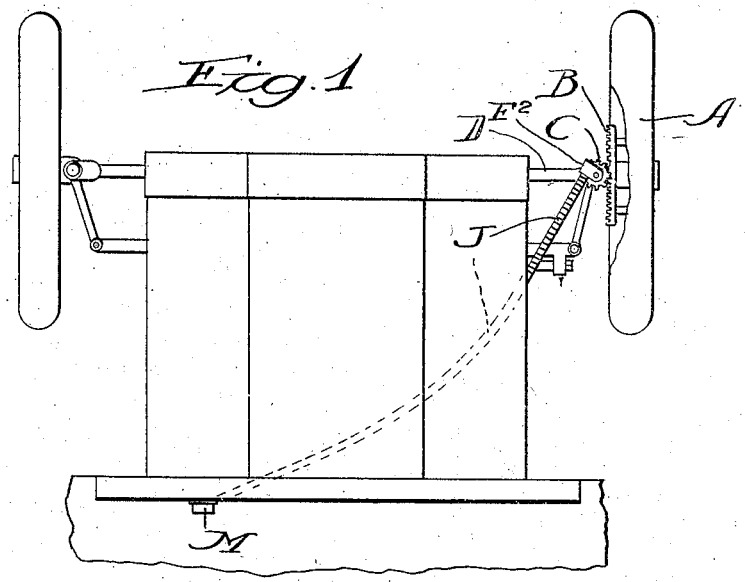
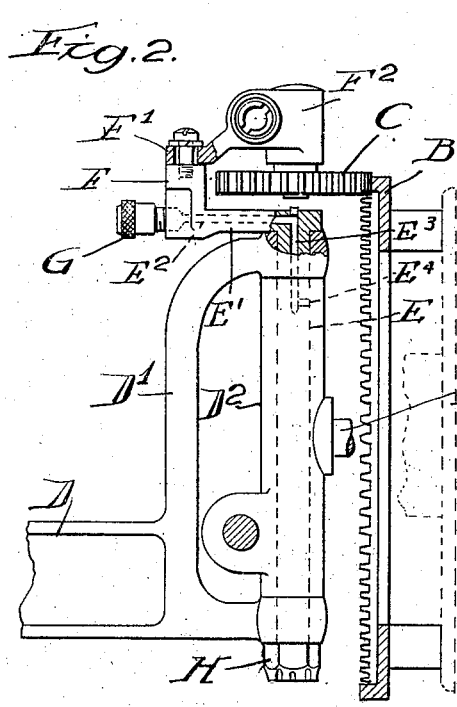
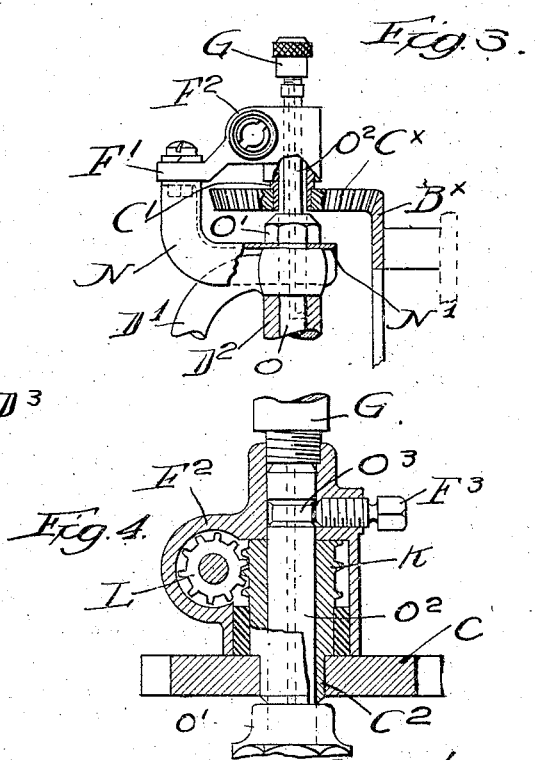
Inventor
John K. Stewart

UNITED STATES PATENT OFFICE.

JOHN K. STEWART, OF CHICAGO, ILLINOIS, ASSIGNOR TO STEWART-WARNER SPEED-OMETER CORPORATION, OF CHICAGO, ILLINOIS, A CORPORATION OF VIRGINIA.

STEERING-WHEEL DRIVE FOR AUTOMOBILE-CARRIED INSTRUMENTS.

1,205,054.  Specification of Letters Patent.  Patented Nov. 14, 1916.

Application filed June 1, 1914. Serial No. 842,055.

*To all whom it may concern:*

Be it known that I, JOHN K. STEWART, a citizen of the United States, residing at Chicago, in the county of Cook and State of Illinois, have invented new and useful Improvements in Steering-Wheel Drives for Automobile-Carried Instruments, of which the following is a specification, reference being had to the accompanying drawings, forming a part thereof.

The purpose of this invention is to provide an improved and simplified drive gearing for automobile speedometers. As is well known, these instruments are commonly mounted on the dash-board and connected through a flexible shaft with one of the front wheels of the vehicle, which is generally a steering wheel and therefore mounted on the front axle for steering movement. Usually the initial drive is by a spur gear fixed to the road wheel meshing with the spur pinion, which obviously must be mounted to move with the road wheel in its movement for steering and to avoid undue bending or buckling of the flexible drive shaft. It is almost universal practice to connect the shaft with the pinion by some form of swivel joint.

The present invention contemplates the the elimination of such a swivel joint by so arranging the intial gear and pinion that the latter may be stationary with respect to the frame of the car, and still remain in mesh with the driving gear throughout the steering movement of the road wheel.

The invention is concerned with the various features and elements required to accomplish this result, as described and shown in the drawings and as indicated by the claims.

In the drawings: Figure 1 is a plan view of the forward portion of a motor vehicle equipped with a speedometer and with a drive gearing embodying this invention. Fig. 2 is a detail elevation of the drive gearing shown in Fig. 1, with certain parts broken away to reveal the detail construction. Fig. 3 is a detail elevation of a modified form of the invention. Fig. 4 is a sectional view of a further modification.

In the form of the device shown in Figs. 1 and 2, one of the front wheels, A of the vehicle is equipped with a co-axially mounted crown gear, B, and a pinion, C, which meshes with the gear, B, is mounted for rotation about the axis of the pivot of the axle joint. This joint or knuckle comprises an axle-terminating member, $D^1$, and a spindle-terminating member, $D^2$. The former is shown as a fork on the axle, and the latter as a cross-head on the spindle and embraced by said fork. These knuckle members will be hereinafter referred to as the axle member and the spindle member respectively, of the knuckle; and the term "knuckle" will be used to designate the joint comprising both of them and their connecting pivot. The vertical bolt which usually forms this pivot is replaced for the purposes of this invention by a special bolt, E, whose head is formed as a bracket, F, carrying an adjustable arm or portion, $F^1$, constituting a gear housing, in which the pinion, C, is journaled. The regular bolt which is replaced by the bolt, E, has its upper end axially drilled and threaded and fitted with an oil cup from which the wearing surface of the bolt and knuckle, $D^2$, are lubricated. To replace this feature, the horizontal portion, $E^1$, of the bracket, E, is provided with an oil duct, $E^2$, connecting with a vertical duct, $E^3$, which has an outlet, $E^4$, leading to the wearing surface to be lubricated, and the bracket is properly threaded to receive an oil cup, G. The lower end of the bolt is provided with a nut, H, or may be threaded simply to receive the regular nut of the original bolt furnished with the car. The bracket member, $F^1$, is dimensioned to bring the axis of rotation of the pinion, C, directly in line with the axis of the knuckle, so that as the road wheel is moved about this axis for steering, the distance of the gear, B, from the axis of the gear, C, will be unchanged and the gears will mesh properly throughout the range of such movement.

From the pinion, C, rotation is communicated to the flexible shaft, indicated at J, through a pair of spiral gears, indicated only by the form of housing shown in Figs. 1 and 2, but shown more in detail in Fig. 4 at K and L, respectively. This housing being formed as an integral part of the bracket arm, $F^1$, will be fixed in relation to the frame of the car, the bracket, F, being clamped firmly to the axle member, $D^1$, of the knuckle by tightening of the nut, H. When once positioned, therefore, the flexible shaft, J, extending from the portion, $F^2$, of the housing, F¹, to the speedometer, M, mounted on the dash-board, will not be subjected to any change of position except that caused by the up-and-down movement of the axle, D, in response to road inequality. The result is a much greater length of life for the flexible shaft as well as an increase in the efficiency of the speedometer drive as a whole.

The modified form of the device shown in Fig. 3 is designed to avoid furnishing a special bolt for connecting the parts, D¹ and D², and with this in view, the bracket member, F, is replaced by the member, N, formed of comparatively thin sheet metal of channel section bent into a right-angled bracket for supporting the adjustable member, F¹. The thin web, N¹, of the bracket, N, is apertured to admit the bolt, O, and is simply clamped under the head, O¹, of said bolt in correct position for supporting the pinion. Incidentally, Fig. 3 shows a bevel pinion, C*, meshing with a bevel gear, B*, which may be substituted for the spur and crown gear respectively, shown in Fig. 2. For maintaining the lubrication of the bolt, O, a tube, O², is provided, screwed into the upper end of said pivot bolt, with its cavity registering with the oil duct, E³, extending up through the hollow spindle, C¹, of the gear, C*, and the oil cup, G, is carried thereby.

A further modification consists in retaining the bolt, O, and utilizing the extension tube, O², as the sole support for the pinion, C, and the spiral gear housing, F². In this case the member, O², will be made as a hardened steel shaft adapted to serve as an axle for the hollow spindle, C². The housing, F², is locked in position by means of a set screw, F³, engaging a groove, O³, near the upper end of the member, O². In this case the oil cup, G, is preferably carried by the housing, F², as indicated in Fig. 4.

I claim:—

1. In combination with a road wheel and an axle therefor having a steering knuckle comprising an axle member, a spindle member and a pivot bolt connecting them; a gear co-axially positioned on the road wheel outside the knuckle; a housing; a member to which the housing is made fast, made rigid with the axle member by means of a knuckle pivot bolt, said housing overhanging the upper end of the knuckle and spaced away therefrom; a shaft journaled within the housing in alinement with the knuckle pivot bolt; a gear on said shaft positioned in the space between the housing and the upper end of the knuckle for meshing with the gear on the road wheel, and a power transmitting shaft operatively connected with the gear which is positioned in said space.

2. In combination with a road wheel and an axle therefor, having a steering knuckle comprising an axle member, a spindle member and a pivot bolt connecting them; a driving gear coaxially positioned on the road wheel outside the knuckle; a gear housing rigid with the axle member of the knuckle, positioned above said member and spaced away therefrom; a hollow-shafted driven gear journaled in said housing with axial cavity alined with the axis of the knuckle, said gear meshing with the driving gear on the road wheel; power-transmitting means operatively connected with said hollow-shafted gear; the knuckle pivot bolt being axially apertured in alinement with the axial aperture of said hollow-shafted rear to form an oil duct accessible through said hollow shaft of the gear.

3. In combination with a road wheel and an axle therefor having a steering knuckle comprising an axle member, a spindle member and a pivot bolt connecting them; a driving gear coaxially positioned on the road wheel outside the knuckle; a gear housing rigid with the axle member of the knuckle, positioned above said member and spaced away therefrom; a hollow-shafted gear journaled in said housing with its axial cavity alined with the axis of the knuckle pivot bolt and meshing with driving gear on the road wheel; power-transmitting means operatively connected with said hollow-shafted gear; the knuckle pivot bolt being axially apertured in alinement with the axial aperture of said hollow-shafted gear to form an oil duct, and an axially-apertured or tubular member inserted through the hollow shaft and into the upper end of the knuckle pivot bolt with its axial aperture registering with the said axial aperture of the pivot bolt.

4. In combination with a road wheel and an axle therefor having a steering knuckle comprising an axle member, a spindle member and a pivot bolt connecting them; a driving gear coaxially positioned on the road wheel outside the knuckle; a member rigid with and extending axially from the knuckle pivot bolt; a gear housing rigidly secured upon said member; a driven gear journaled in the housing encompassing said member, the housing over-hanging the upper end of the knuckle and spaced away therefrom, said gear being positioned in the space between the housing and the upper end of the knuckle for meshing with the driving gear on the road wheel, and a power-transmitting shaft operatively connected with said driven gear.

5. In combination with a road wheel and an axle therefor having a steering knuckle comprising an axle member, a spindle member and a pivot bolt connecting them; a driving gear coaxially positioned on the road wheel outside the knuckle; a member rigid with the knuckle pivot bolt and extending in alinement therewith above the upper end of the knuckle; a housing rigidly secured to said member overhanging the upper end of the knuckle and spaced away therefrom; a driven gear journaled in the housing and on said member, said gear being positioned in the space between the housing and the upper end of the knuckle for meshing with the driving gear on the road wheel, and a power-transmitting shaft operatively connected with said driven gear.

6. In combination with a road wheel and an axle therefor having a steering knuckle comprising an axle member, a spindle member and a pivot bolt connecting them; a driving gear coaxially positioned on the road wheel outside the knuckle; a member extended rigidly from the upper end of the knuckle pivot bolt above the knuckle; said member and said knuckle pivot bolt having axial apertures registering with each other to form an oil duct leading to the upper end of said member; a housing secured rigidly to said member spaced away from the upper end of the knuckle; a hollow shafted driven gear having its hollow shaft journaled on said member within the housing, said driven gear being positioned in the space between the housing and the upper end of the knuckle for meshing with the driving gear on the road wheel, and a power-transmitting shaft operatively connected with said driven gear.

In testimony whereof I have hereunto set my hand at Chicago, Illinois, this 27th, day of May, 1914.

JOHN K. STEWART.

Witnesses:
C. B. SMITH,
H. BLIVEN.